July 18, 1950      S. G. DOWN      2,515,951
LOCOMOTIVE THROTTLE CONTROL
Filed Dec. 13, 1945
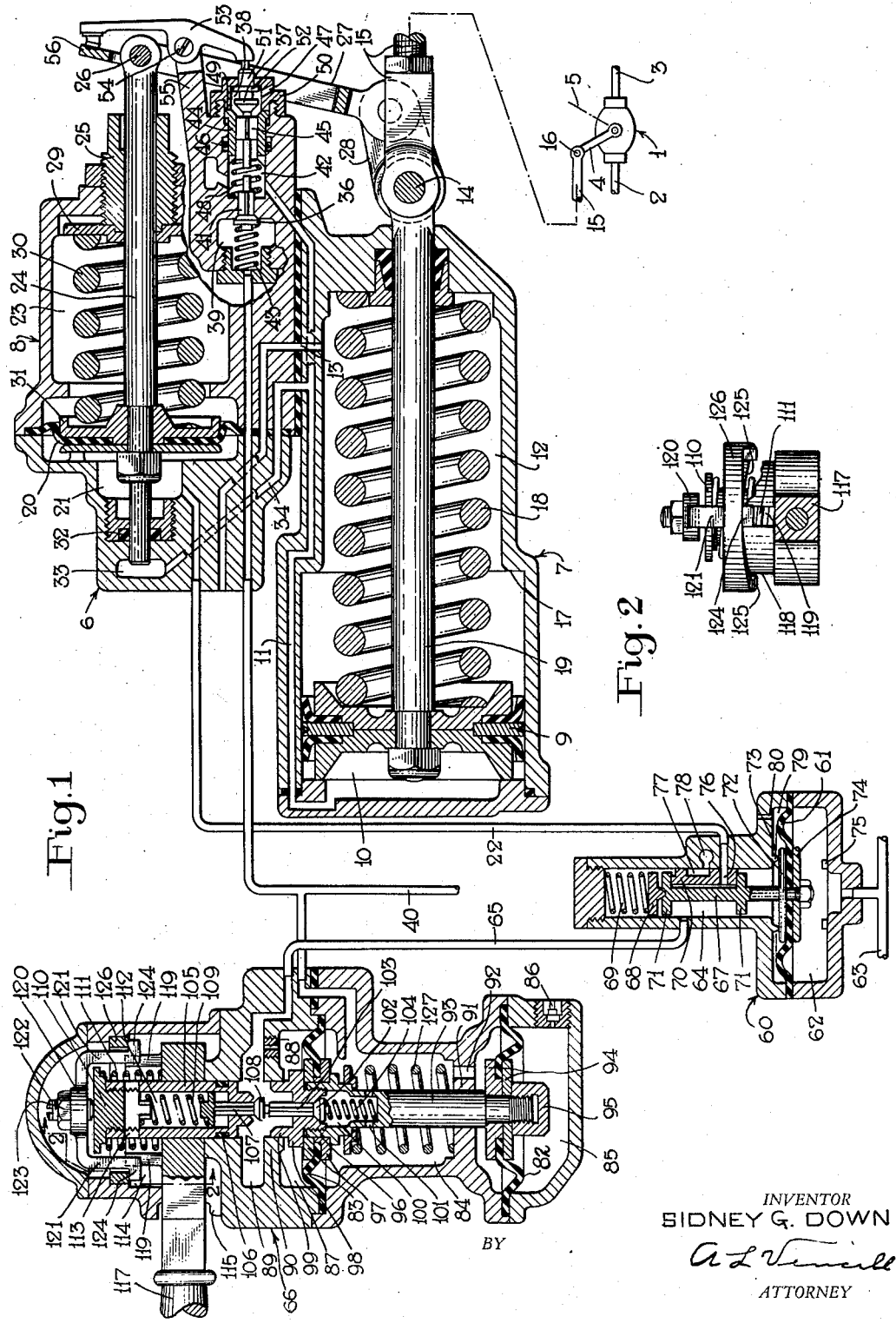
INVENTOR
SIDNEY G. DOWN
BY
ATTORNEY Patented July 18, 1950

2,515,951

UNITED STATES PATENT OFFICE 2,515,951

LOCOMOTIVE THROTTLE CONTROL

Sidney G. Down, Edgewood, Pa., assignor to The Westinghouse Air Brake Company, Wilmerding, Pa., a corporation of Pennsylvania Application December 13, 1945, Serial No. 634,843

4 Claims. (Cl. 192—3)

This invention relates to locomotive throttle control apparatus and more particularly to the fluid pressure type.

When the brakes on a locomotive or on a locomotive and cars of a train are applied to decelerate or stop the locomotive or train, it is usually desirable to close the throttle so as to cut off the motive power, and one object of the invention is the provision of means for accomplishing this result automatically.

Another object of the invention is the provision of means controlled by pressure of fluid in the usual train brake pipe for automatically closing the locomotive throttle upon a reduction in pressure in said brake pipe for effecting an application of brakes.

In railway service there are two different types of brake application, namely, a service application which is ordinarily employed for controlling deceleration of the train, and an emergency application employed for stopping the train in as short a distance as possible. An emergency application of brakes may result from venting of fluid under pressure from the brake pipe by operation of the engineer's brake valve device or by rupture of the brake pipe, and in either case the pressure of fluid in the brake pipe is usually reduced to that of the atmosphere and hence to a degree lower than required for effecting a full service application of the brakes.

Another object of the invention is therefore the provision of means for automatically closing the locomotive throttle upon a reduction in brake pipe pressure in excess of that required to effect a full service application of brakes.

Other objects and advantages will be apparent from the following more detailed description of the invention.

In the accompanying drawing; Fig. 1 is a diagrammatic view, mainly in section, of a locomotive throttle control apparatus embodying the invention; and Fig. 2 is a sectional view taken on the line 2—2 in Fig. 1.

Description

In the drawings, the reference numeral 1 indicates an adjustable engine throttle valve device for controlling flow of power fluid, such as steam, from a pipe 2 to a pipe 3. The pipe 2 may be supplied with steam from a locomotive boiler (not shown) while the pipe 3 may be arranged to convey steam supplied thereto to the locomotive driving means (not shown) for propelling the locomotive. The throttle valve device is operable to regulate or vary the amount of steam supplied to pipe 3 by adjustment of a lever 4 to and between a throttle closed or power off position in which it is shown in the drawing, and a fully open or maximum power position such as indicated by a dot-dash line 5.

A fluid motor 6 is provided which comprises a power position 7 for adjusting the throttle control lever 4 and a pilot portion 8 for regulating operation of the power portion 7 in accordance with pressure of fluid in a control pipe 22.

The power portion 7 of the fluid motor 6 comprises a casing containing a double acting piston 9 having at one side a pressure chamber 10 connected to a fluid pressure control passage 11 and having at the opposite side a chamber 12 which may be open to atmosphere through a passage 13. The piston 9 is connected to one end of a piston rod 19 extending through chamber 12 to the exterior of the casing. The opposite end of rod 19 is pivotally connected by a pin 14 to one end of an adjustable link 15 the opposite end of which is pivotally connected by a pin 16 to the end of the throttle control lever 4.

Movement of the power piston 9 in its casing will rock the throttle control lever 4 for varying the steam supply from pipe 2 to pipe 3, and the parts are so arranged that with said piston in the position in which it is shown in the drawing the throttle control lever 4 will occupy the throttle closed or power off position in which it is shown in the drawing, while upon movement of said piston into contact with a stop shoulder 17 in the casing the throttle control lever 4 will be moved to the fully open or maximum power position indicated by dot-dash line 5. By suitable adjustment of the power piston 9 between the two extreme positions just described, the throttle control lever 4 may be correspondingly adjusted to provide any desired amount of steam to pipe 3, as will be obvious.

A coil spring 18 encircling the piston rod 19 in chamber 12 bears against the adjacent face of piston 9. This spring is under pressure and adapted to move piston 9 to the power off position in which it is shown in the drawing when fluid under pressure is released from pressure chamber 10. When fluid is supplied to chamber 10 at a pressure sufficient to overcome the opposing force of spring 18 the piston 9 will move against said spring for moving the throttle control lever 4 out of its closed or power off position in the direction of the dot-dash line 5 to a position corresponding to the pressure of such fluid. A maximum pressure of fluid in chamber 10 will move piston 9 into contact with shoulder 17 to move the throttle control lever to its fully open position.

The pilot portion 8 of the fluid motor 6 comprises a movable abutment preferably in the form of a flexible diaphragm 20 which is clamped around its edge in the casing. At one side of diaphragm 20 is a control chamber 21 open to the control pipe 22 while at the opposite side is a non-pressure chamber 23. A rod 24 secured to diaphragm 20 centrally thereof extends through chamber 23 and a bore in an adjusting nut 25, secured in the casing, to the exterior of the casing where it is connected by a pin 26 to one end of a link 27. The opposite end of link 27 is pivotally connected by a short link 28 to pin 14 which connects the power piston rod 19 to the adjustable link 15.

The adjusting nut 25 supports, within chamber 23, a spring follower 29 which carries one end of a coil spring 30 encircling the rod 24. The opposite end of spring 30 bears against a follower plate 31 engaging the adjacent face of diaphragm 20. A portion of rod 24, which is of reduced diameter, extends through diaphragm 20, chamber 21 and a suitable sealing ring 32 into a chamber 33 which is open through a passage 34 to passage 11.

The pilot portion 8 of the fluid motor 6 further comprises a poppet type fluid pressure supply valve 36 and an oppositely seating and coaxially aligned poppet type fluid pressure release valve 37 contained in a chamber 38. The supply valve 36 is contained in a chamber 39 adapted to be constantly supplied with fluid under pressure from any suitable source by way of a fluid pressure supply pipe 40. The supply valve 36 has a fluted stem 41 slidably mounted in and extending through a bore in the casing into a chamber 42 to which passage 11 is open, and the casing has a seat for said valve around the end of said bore adjacent chamber 39. A spring 43 in chamber 39 acts on the supply valve 36 for urging it to its seat.

The release valve 37 is carried by a sleeve 44 which is slidably mounted in the casing and which has a through bore in which is disposed a fluted stem 45 projecting from said valve. In chamber 38 the sleeve 44 has a seat encircling the through bore for engagement by the release valve 37. The sleeve 44 is encircled by a sealing ring 46 carried in an annular groove in the casing and having a sliding contact with the peripheral surface of said sleeve for preventing leaking of fluid under pressure past the external surface of said sleeve from chamber 42 to chamber 38 and thence to atmosphere through a port 47. A coil spring 48 in chamber 42 acts on one end of sleeve 44 for urging it into contact with a shoulder 49 provided on a cap nut 50. The cap nut 50 is secured to the casing and with sleeve 44 defines the release valve chamber 38. The cap nut 50 has an axial bore in which is slidably mounted a plunger 51, and on the end of said plunger within chamber 38 is a head 52 arranged for contact by the release valve 37. With the sleeve 44 in contact with shoulder 49 and with the head 52 in contact with cap nut 50 the release valve 37 is adapted to be unseated from said sleeve, as will be later described, for opening communication between chambers 42 and 38, under which condition the adjacent ends of the two valve stems 41 and 45 are adapted to be spaced apart a distance equal substantially to that between said valve and its seat. Upon movement of plunger 51 in the direction of the left hand it will first move the release valve 37 relative to sleeve 44 until it engages its seat on said sleeve and then further movement will move said sleeve and act through the valve stems 45 and 41 to open the supply valve 36 to establish communication between chambers 39 and 42. Upon release of pressure on plunger 51 spring 48 will move sleeve 44 along with the release valve 37 in the direction of the right hand to permit closing of the supply valve 36 by spring 43 and until said sleeve engages shoulder 49, following which the release valve 37 will move relative to and out of seating engagement with said sleeve as will be later described.

The end of plunger 51 outside of cap nut 50 engages one end of a lever 53 which is fulcrumed intermediate its ends on a pin 54 carried by an arm 55 projecting from the casing. The opposite end of lever 53 is arranged for engagement by a finger 56 formed integral with and projecting from link 27 at the opposite side of pivot pin 26.

When the fluid pressure control pipe 22 and the diaphragm control chamber 21 are open to atmosphere, in a manner which will be later described, the flexible diaphragm 20 and thereby rod 24 and the connected end of link 27 will assume the position in which they are shown in the drawing under the action of spring 30. With the diaphragm 20 and rod 24 in this position the release valve 37 will be permitted to open and the supply valve 36 will be closed for reasons which will become apparent from the description to follow, whereby the power piston chamber 10 will be open to atmosphere through passage 11, past said release valve and through the atmospheric vent port 47. With chamber 10 open to atmosphere spring 18 will position the power piston 9 as shown in the drawing for moving the throttle control lever 4 to its throttle closed or power off position for cutting off the supply of motive power to the locomotive.

When fluid under pressure is supplied to pipe 22 in a manner which will be also later described, such pressure will flow to chamber 21 and therein act on diaphragm 20 in opposition to spring 30. When the pressure thus provided in chamber 21 becomes sufficient to overcome the opposing force of spring 30 the diaphragm 20 will be deflected in the direction of the right hand and move the connected end of link 27 in the same direction. This movement of link 27 will actuate finger 56 and lever 53 for moving the release valve 37 into engagement with its seat on sleeve 44 and will then actuate said sleeve along with said release valve to open the supply valve 36. Fluid under pressure from the supply pipe 40 will then flow past the supply valve 36 to passage 11 and thence to the power piston chamber 10. When the pressure of fluid in chamber 10 then becomes sufficient to overcome the opposing force of the regulating spring 18, the piston 9 will move against said spring and actuate link 15 to move the throttle control lever 4 out of its throttle closed or power off position in the direction of the maximum power position indicated by the dot-dash line 5.

As the power piston 9 is thus moved in the direction of the right hand it will act through links 28 and 27 to rock finger 56 in a counterclockwise direction about its connection with pin 26, assuming that the diaphragm 20, the rod 24 and said pin have become stationary as will occur when the pressure of spring 30 is increased to a degree by movement of diaphragm 20 sufficient to counterbalance the pressure of fluid provided in chamber 21. As the finger 56 is thus moved in a counterclockwise direction it will permit lever 53 to be rocked in a like direction by movement of the release valve 37 and of sleeve 44 in the direction of the right hand by the pressure of spring 48 and of fluid now present in chamber 42 acting on said sleeve. As the release valve 37 and sleeve 44 are thus shifted spring 43 will move the supply valve 36 toward, and finally into contact with its seat in a position corresponding to that of diaphragm 20, for cutting off the supply of fluid under pressure to passage 11 and thereby to the power piston chamber 10. The power piston 9 will then cease movement since the pressure of spring 18 will counterbalance the pressure of fluid present in chamber 10, and as a result, the link 27 and finger 56 will also cease movement and thus limit counterclockwise rotation of lever 53 to prevent unseating of the release valve 37 from its seat on the sleeve 44.

It will thus be seen that the power piston 9 will cease movement in a position corresponding to the position of the pilot diaphragm 20 and thus corresponding to the pressure of fluid provided in diaphragm chamber 21, whereby the position of the throttle control lever 4 and thus the amount of steam supplied to pipe 3 will also be limited in accordance with the pressure of fluid provided in said chamber and in the control pipe 22.

If it is desired to increase the amount of steam supplied to pipe 3 the pressure of fluid in pipe 22 and thereby in diaphragm chamber 21 will be increased to move diaphragm 20 further against spring 30 to a new position corresponding to the degree of such increase in fluid pressure. This movement of diaphragm 20 will again act through finger 56 to actuate lever 53 and thereby the release valve 37 and sleeve 44 to again open the supply valve 36 for supplying more fluid under pressure to the power piston chamber 10. The power piston 9 will then move further in the direction of the right hand for operating the power control lever 4 to increase the supply of steam to pipe 3, and this movement of said piston will actuate the link 27 and finger 56 to again permit counterclockwise movement of lever 53 to permit closing of the supply valve 36 in a position of piston 9 corresponding to the increased pressure of fluid in diaphragm chamber 21.

If the pressure of fluid provided through pipe 22 in diaphragm chamber 21 is sufficient to move said diaphragm to a position defined by contact between the follower plate 31 and the casing, then the adjacent end of link 27 will be so positioned that piston 9 will be moved into contact with shoulder 17 in the casing at least by the time the supply valve 36 is permitted to seat due to such movement of piston 9.

From the above description it will now be seen that the throttle control lever 4 may be moved from its throttle closed or power off position, in which it is shown in the drawing, to any selected position to and including the full open or maximum power position, indicated by the dot-dash line 5, by providing fluid at the proper pressure through the pipe 22 in the diaphragm chamber 21.

Now let it be assumed that steam is being supplied to pipe 3 and that it is desired to reduce the amount of such supply. In order to accomplish this the pressure of fluid in the control pipe 22 will be reduced to a desired degree and this reduction in pressure in chamber 21 will permit the opposing pressure of spring 30 to move the diaphragm 20 to a new position corresponding to such reduction. This movement of diaphragm 20 and thereby of rod 24 and finger 56 in the direction of the left hand will permit pressure of spring 48 and of fluid in chamber 42 to move sleeve 44 into contact with shoulder 49 on cap nut 50, following which the pressure of fluid, by itself, in chamber 42 will unseat the release valve 37 from the end of sleeve 44. Fluid under pressure will then be released from the power piston chamber 10 through passage 11, past the release valve 37 to chamber 38 and thence to atmosphere through port 47.

As the pressure of fluid in chamber 10 is thus reduced spring 18 will move the piston 9 in the direction of the left hand for thereby actuating the throttle control lever 4 to reduce the amount of steam supplied to pipe 3. This movement of piston 9 in the direction of the left hand will also turn link 27 and thereby finger 56 in a clockwise direction to rock lever 53 in a corresponding direction to thereby move the release valve 37 back toward, and finally into contact with its seat on the end of sleeve 44 in a position of piston 10 corresponding to that of diaphragm 20 and fulcrum pin 26. This seating of the release valve 52 will then prevent further reduction in pressure of fluid in chamber 10 and will thus limit such pressure to a degree corresponding to the change in position of pin 26 and thereby of diaphragm 20 as governed by the reduction in pressure of fluid in chamber 21. As soon as the release valve 37 is closed to prevent further release of fluid under pressure from chamber 10 movement of piston 9 will cease, due to the reduced pressure of spring 18, in a position, it will be noted, also corresponding to the reduced pressure of fluid in chamber 21, whereby movement of the throttle control lever 4 will cease in a corresponding position thereby reducing the supply of steam to pipe 3 to a degree corresponding to the reduced pressure of fluid in the control pipe 22.

If it is desired to further reduce the amount of steam supplied to pipe 3, a further reduction in pressure of fluid in the control pipe 22 and in chamber 21 will be effected and the fluid motor 6 will again operate in the same manner as just described to correspondingly change the position of the throttle control lever 4 for effecting a corresponding reduction in the amount of steam supplied to pipe 3. If the pressure of fluid in chamber 21 is reduced to that of the atmosphere the diaphragm 20 will be returned by spring 30 to its normal position in which it is shown in the drawing, and the power piston 9 will be returned to its normal position by spring 18 and the release valve 37 will still be open, and this return of the power piston to its normal position will actuate the throttle control lever 4 to its throttle closed or power off position in which it is shown in the drawing.

It will now be seen that the fluid motor 6 will adjust the throttle valve device 1 to vary the amount of steam supplied to pipe 3 in direct proportion to the pressure of controlling fluid provided in the control pipe 22.

The control pipe 22 leads to a throttle and brake interlock valve device 60 which comprises a casing containing a flexible diaphragm 61. At one side of diaphragm 61 is a chamber 62 which is open to a pipe 63 constituting a brake control pipe of the type from which fluid under pressure is released or vented for effecting an application of brakes. More specifically, the pipe 63 may constitute what is commonly known as a "brake pipe" which in railway service extends through a train and from which fluid under pressure is adapted to be released for effecting either a service or an emergency application of brakes. For effecting a full service application of brakes, a full service reduction in pressure in brake pipe 63 will be effected, i. e., the pressure of fluid in said pipe will be reduced to a certain degree such as to 50 pounds, from a normal 70 pounds pressure carried in said brake pipe, while for effecting an emergency application of brakes the pressure of fluid in said pipe will be reduced to a lower degree such as atmospheric pressure, as is well known.

At the opposite side of diaphragm 61 is a chamber 64 which is connected through a pipe 65 to an operator's throttle control valve device 66. One end of a stem 67 contained in chamber 64 is connected to the center of diaphragm 61, while engaging the opposite end of said stem is a spring follower 68 which is subject to the pressure of a light precompressed spring 69. A slide valve 70 disposed in chamber 64 between two spaced collars 71 on stem 67 and thus arranged for movement with said stem has a seat to which the control pipe 22 is connected. The slide valve 70, stem 67 and diaphragm 61 have two positions, namely, a throttle control position in which these parts are shown in the drawing and which is defined by contact between a follower 72 secured to one side of said diaphragm and a sealing ring 73 provided in the casing, and a power off position adapted to be defined by contact between a follower 74 secured to the opposite face of the diaphragm and a stop 75 in the casing. The slide valve 70 has a port 76 which in the throttle control position of said valve establishes communication between the fluid pressure control pipe 22 and chamber 64 and thereby the control pipe 65 leading to the operator's control valve device. In the power off position of slide valve 70 communication between port 76 and the control pipe 22 is adapted to be closed by said slide valve and a cavity 77 therein is adapted to connect said control pipe 22 to an atmospheric vent port 78.

The sealing ring 73 when engaged by the diaphragm follower 72 is adapted to prevent leakage of fluid under pressure from chamber 64 within said ring to a chamber 79 which is formed around the exterior of said ring, both of said chambers being at the same side of diaphragm 61. In order to prevent fluid under pressure accumulating in chamber 79 in case of leakage of fluid under pressure from chamber 64 past the sealing ring 73, and to thereby insure that the portion of diaphragm 61 encircling said sealing ring will be subject to atmospheric pressure when follower 72 is in contact with said ring, the chamber 79 may be open to atmosphere through a small leak port 80.

When the pressure of fluid in brake pipe 63 is at or in excess of the reduced degree required for effecting a full service application of brakes such pressure acting in chamber 62 on diaphragm 61 is adapted to hold said diaphragm in the position in which it is shown in the drawing in sealing contact with the sealing ring 73, against the maximum pressure of fluid which may be provided through pipe 65 in chamber 64 for supply through pipe 22 to control operation of the fluid motor 6, plus the relatively light pressure of spring 69.

The area of diaphragm 61 within the sealing ring 73 is however such that when the pressure of fluid in brake pipe 63 and chamber 62 is reduced to a degree below that required to effect a full service application of brakes, any pressure of fluid which may be acting in valve chamber 64 plus the pressure of spring 69 will deflect the diaphragm 61 out of contact with said sealing ring. When the diaphragm follower 72 is thus moved out of contact with sealing ring 73 pressure of fluid in chamber 64 will also become effective in chamber 79 over the full area of diaphragm 61 to thereby provide an increased force opposing pressure of fluid in chamber 62, and this increased force will promptly move the diaphragm 61 to the power off position defined by contact between follower 74 and stop 75. This movement of diaphragm 20 to the position defined by contact with stop 75 will shift the slide valve 70 to close communication between chamber 64 and the motor control pipe 22 and open said pipe through cavity 77 in said slide valve to the atmospheric port 78, for thereby opening to atmosphere diaphragm chamber 21 in the fluid motor 6 to insure operation of said motor to move the throttle control lever 4 to its throttle closed or power off position.

The pressure of spring 69 is such as to insure movement of diaphragm 61 to the position defined by contact between follower 74 and stop 75 in case there is no fluid pressure effective in chamber 64 at a time when the pressure in the brake pipe 63 is reduced to substantially atmospheric pressure upon an emergency reduction in pressure in said pipe, but it will be apparent that such movement will not occur until after the pressure in the brake pipe is reduced to a lower degree than would occur if chamber 74 were charged with fluid under pressure at this time. The purpose of thus opening pipe 22 to atmosphere under such a condition is to insure that motor 6 will not be operated to supply steam to the engine while the brakes on the train are applied in emergency.

The operator's control valve device 66 comprises a casing containing two coaxially aligned and spaced apart flexible diaphragms 82 and 83 which are clamped in the casing around their edges. Between the two diaphragms 82 and 83 is a chamber 84 open to the fluid pressure supply pipe 40 and thus adapted to be constantly charged with fluid under pressure. At the opposite side of diaphragm 82 is a chamber 85 which is open to atmosphere through a breather port 86, while at the opposite side of diaphragm 83 is a chamber 87. The chamber 87 is connected through a stabilizing choke 88 to a chamber 89 separated from chamber 87 by a wall 90 having a bore in which said choke is disposed. Chamber 89 is open to the control pipe 65.

Chamber 84 is divided into two parts by a partition wall 91 having an opening 92 providing a constantly open communication between said two parts. The partition wall 91 also has a through bore arranged coaxially with respect to the two diaphragms 82 and 83 and slidably mounted in this bore and extending through the two parts of chamber 85 is a stem 93. One end of stem 93 is connected to the center of diaphragm 82 by follower plates 94 and a clamping nut 95. The opposite end of stem 93 is provided with an enlargement 96 extending through the center of diaphragm 83 and secured thereto by clamping plates 97 and a clamping nut 98 disposed in chamber 87.

The clamping nut 98 has a cylindrical extension 99 slidably mounted in a bore provided through wall 90. The enlargement 96 of stem 93 has a chamber 100 open through a port 101 to chamber 85 and containing a fluid pressure supply valve 102 having a fluted stem 103 extending through an axial bore in nut 98 into chamber 89, said nut having around said bore a seat for said valve. A spring 104 contained in chamber 100 acts on the supply valve 102 for urging it to its seat.

The casing is provided with an axial bore open to chamber 89 opposite the cap nut 98, and slidably mounted in this bore is a sleeve 105 which carries a ring 106 having sealing and sliding contact with the surface of said bore for preventing leakage of fluid under pressure from chamber 89. In the end of sleeve 105 adjacent chamber 89 is an axial bore in which is slidably disposed a fluted stem 107 of a fluid pressure release valve 108 contained in chamber 89, said sleeve being provided around said bore with a seat for said valve. The release valve 108 and stem 107 are arranged in coaxial relation with the supply valve 102 and its stem 103, and said release valve is urged into contact with the end of the supply valve stem 103 by a spring 109 contained in the sleeve 105. The opposite end of sleeve 105 is closed by a cap nut 110 extending into the sleeve for supporting the adjacent end of spring 108 and extending beyond the outer portion of the sleeve to provide a seat for one end of a bias spring 111. The interior of sleeve 105 is constantly open to atmosphere through one or more ports 113 in the sleeve adjacent the cap nut 109, a chamber 114 in the casing and an opening 115.

The pressure of spring 109 on the release valve 108 is less than the pressure of spring 104 on the supply valve 102, so that upon movement of sleeve 105 in the direction of said supply valve the spring 104 will hold said release valve against movement until engaged by said sleeve following which further movement of said sleeve will act through said release valve to open said supply valve, and so that upon movement of said sleeve in the opposite direction spring 104 will seat the supply valve 102 before spring 109 becomes effective to hold the release valve 108 against movement whereby sleeve 105 may move out of contact with said release valve.

A coil regulating spring 127 encircling stem 73 in chamber 84 has one end supported on the partition wall 91 while the opposite end is arranged to act on diaphragm 83 in opposition to pressure of fluid in chamber 87. With diaphragm 83 and sleeve 105 in the positions in which they are shown in the drawing, and in which the supply valve 102 is seated and the release valve 108 is open, said spring is adapted to be expanded to its free height.

Extending through the opening 115 into chamber 114 and therein supported on the casing and encircling the sleeve 105 is an operator's control lever 117 which supports the end of bias spring 111 opposite that engaging the cap nut 110. Within chamber 114 the lever 117 is provided with an upwardly extending cylindrical portion 118 encircling the bias spring 111 and having two oppositely arranged longitudinally extending slots 119. An inverted U-shaped saddle 120 extending over the cap nut 110 has two oppositely arranged legs 121 slidably mounted in the slots 119 in the cylindrical portion 118 of lever 117. In the bottom or base portion of saddle 120 is a regulating screw 122 engaging the cap nut 110 and secured in an adjusted position by a lock nut 123. Each of the saddle legs 121 is provided with an outwardly extending toe 124, the two toes 124 slidably engaging oppositely arranged and like cam surfaces 125 provided on a ring 126 which is secured in the casing.

With the operator's control lever 117 in what may be called a normal position, in which it is shown in Figs. 1 and 2 of the drawing, the toes 124 engage portions of the cam surfaces 125 which permit movement of sleeve 105 by bias spring 111 to a maximum upward position in which the release valve 108 is unseated from the end of sleeve 105 by spring 109 while the supply valve 102 is closed by spring 104. With the supply valve 102 closed and the release valve 108 open chamber 89 and thereby the control pipe 65 are open to atmosphere past said release valve, through the interior of sleeve 105, port 113, chamber 114, and opening 115.

If the operator's control lever 117 is moved from the normal position in a direction away from the reader, as viewed in Fig. 1, or in the direction of the left hand as viewed in Fig. 2, this movement will turn the saddle 120 relative to the ring 126 and engagement between the saddle toes 124 and the cam surfaces 125 on said ring will move the sleeve 105 in the direction of the release valve 108. If this movement of the operator's control lever 117 is sufficient, the sleeve 105 will be moved into contact with the release valve 108 and then move said release valve to open the supply valve 102 to an extent corresponding to the position of said lever. Fluid under pressure supplied to chamber 84 from the fluid pressure supply pipe 40 will then flow past the supply valve 102 into chamber 89 and thence to the control pipe 65 and through choke 88 into chamber 87 wherein it will act on diaphragm 83 in opposition to the pressure of spring 127.

When the pressure of fluid thus obtained in chamber 87 and in the control pipe 65 is increased to a degree sufficient to overcome the force of spring 127 the diaphragm 83 will deflect against said spring in the direction of the supply valve 102. Assuming that movement of the operator's control lever 117 from its normal position has been limited to less than a maximum degree, the supply valve 102 will be stationary so that movement of diaphragm 83 by increasing pressure of fluid in chamber 87 will be relative to said valve until the cap nut 98 is moved into contact with said valve for preventing further flow of fluid under pressure to said chamber and to the control pipe 65. When the supply of fluid under pressure to the control pipe 65 and to chamber 87 is thus cut off, limiting the increase in such pressure, movement of the diaphragm 84 will cease, since the increased pressure of spring 127 will counterbalance the pressure of fluid in said chamber, whereby the pressure of fluid in said chamber and in the control pipe 65 will be limited in accordance with the position of the supply valve 102 as defined by the extent of movement of the operator's control lever 117 from its normal position.

If the operator desires to increase the pressure of fluid in chamber 87 and in the control pipe 65 he will move lever 117 further in the direction of the left hand as viewed in Fig. 2 of the drawings for thereby again unseating the supply valve 102. Fluid under pressure will then again be supplied past the supply valve 102 to the control pipe 65 and diaphragm chamber 87, and the diaphragm 83 will again be flexed against spring 127 until the supply valve 102 is again seated for limiting the pressure of fluid in the control pipe 65 in accordance with the new position of the operator's control lever 117. It will thus be seen that by suitable adjustment of the operator's control lever 117 out of its normal position, in the direction of the left hand as viewed in Fig. 2 of the drawings, any desired pressure of fluid may be provided in the control pipe 65.

Assuming that the control pipe 65 is charged with fluid under pressure as just described and the operator desires to reduce the pressure of such fluid, he will move the control lever 117 in the direction of the right hand, as viewed in Fig. 2 of the drawing, whereupon the position of the saddle toes 124 with respect to the cam surfaces 125 will be so changed as to permit bias spring 111 to move the sleeve 105 in a direction away from the supply valve 102. With the supply valve 102 seated, spring 109 will hold the release valve 108 against movement with the sleeve 105 so that said release valve will be opened to connect chamber 89 and the control pipe 65 to atmosphere. Fluid under pressure will then be released from chamber 89 and pipe 65 and also from chamber 87 above the diaphragm 83 and as the pressure of fluid in chamber 87 reduces spring 127 will move the diaphragm 83 in an upwardly direction, and spring 104 acting on the supply valve 102 will move said valve and the release valve 108 with said diaphragm.

Assuming that the operator's control lever is still out of its normal position and that movement of the sleeve 105 in an upwardly direction is limited to a degree less than to its normal position, this movement of diaphragm 83 by spring 127 and thereby of the supply valve 102 and release valve 108 by spring 104 will be relative to said sleeve until said release valve moves into seating engagement with said sleeve for preventing further release of fluid under pressure from pipe 65 and chamber 87. Movement of diaphragm 84 will then cease since the pressure of fluid remaining in chamber 87 will counterbalance the reduced pressure of spring 127. It will thus be seen that the pressure of fluid in the control pipe 65 will be reduced only to a degree corresponding to the change in position of the operator's control lever 117 and thereby to the corresponding change in position of sleeve 105.

If the lever 117 is moved further toward, but not to, its normal position, the structure will again operate to cause a corresponding reduction in the pressure of fluid in pipe 65, while if the lever 117 is returned to its normal position, in which it is shown in the drawing, the sleeve 105 will be moved to such a position as to prevent closure of the release valve 108 at the time the spring 127 becomes expanded to its free height. Under this latter condition the release valve 108 will thus remain open so as to completely vent the fluid pressure from the control pipe 65.

With the parts of the throttle and brake interlock valve device 60 in the position in which they are shown in the drawing, establishing the communication between control pipes 65 and 22, and thereby between the operator's control device 66 and the pilot diaphragm chamber 21 in fluid motor 6, it will now be seen that by operation of said control device the operator may cause operation of the fluid motor 6 to adjust the throttle control lever 4 to any position between and including its power off position in which it is shown in the drawing and its maximum power position indicated by the dot-dash line 5, so as to thereby cut off the supply of steam to pipe 3 or provide any selected amount of steam to said pipe, but with the parts of the brake and throttle interlock valve device in the other position as defined by engagement between the diaphragm follower 74 and stop 75, control of the steam supply to pipe 3 by the operator's control valve device 66 is prevented and the supply of steam to the locomotive is cut off.

*Summary*

From the above description it will now be noted that the brake and throttle interlock valve device 66 permits the operator to control the throttle valve device 1 by operation of the control valve device 66 for regulating the supply of steam to pipe 3, when the brake pipe 63 is charged with fluid at a pressure not less than a chosen degree, such for example as required to permit a full service application of brakes, but prevents control of the steam supply to pipe 3 and automatically causes closing of the steam throttle valve device 1, if open, when the pressure in said pipe is at a lower degree, as upon an emergency reduction in pressure in said pipe.

Having now described my invention, what I claim as new and desire to secure by Letters Patent, is:

1. In an engine throttle control apparatus, in combination, an engine throttle device for controlling the power output of said engine having a power off position and a power on position, a fluid motor operable by fluid under pressure to move said throttle device from said power off position to said power on position, means operable upon release of fluid under pressure from said motor to move said throttle device to said power off position, an operator's control device for supplying fluid under pressure to said motor, a brake control pipe, and means operable upon release of fluid under pressure from said brake control pipe to release fluid under pressure from said motor and upon supply of fluid under pressure to said pipe to render said operator's control device effective to supply fluid under pressure to said motor.

2. In an engine throttle control apparatus, in combination, an engine throttle device for controlling the power output of said engine having a power off position and a power on position, a fluid motor operable by fluid under pressure to move said throttle device from said power off position to said power on position, means operable upon release of fluid under pressure from said motor to move said throttle device to said power off position, an operator's control device for supplying fluid under pressure to and for releasing fluid under pressure from said motor, a brake control pipe, and an interlock valve device controlling communication between said control device and motor, said interlock valve device being controlled by pressure of fluid in said brake control pipe and being operable upon a reduction in pressure of fluid in said brake control pipe to close said communication and at the same time release fluid under pressure from said motor.

3. In an engine throttle control apparatus, in combination, an engine throttle device for controlling the power output of said engine having a power off position and a power on position, a fluid motor operable by fluid under pressure to move said throttle device from said power off position to said power on position, means operable upon release of fluid under pressure from said motor to move said throttle device to said power off position, an operator's control device for supplying fluid under pressure to and for releasing fluid under pressure from said motor, a brake control pipe, and an interlock valve device comprising valve means controlling communication between said control device and motor, and means operable by fluid in said pipe at a pressure exceeding a certain degree to actuate said valve means to open said communication and operable upon a reduction in such pressure to a lesser degree to actuate said valve means to close said communication and at the same time release fluid under pressure from said motor.

4. In an engine throttle control apparatus in combination, an engine throttle device for controlling the power output of said engine and having a power off position and a power on position, a fluid motor operable by fluid under pressure to move said throttle device to said power on position, means operable upon release of fluid under pressure from said motor to move said throttle device to said power off position, a communication for conveying fluid under pressure to and from said motor, an operator's control device for supplying fluid under pressure to and for releasing fluid under pressure from said motor through said communication, valve means controlling the fluid pressure supply and release communication between said control device and motor and selectively operable to either open said communication, or to close said communication and at the same time release fluid under pressure from said motor, a brake pipe, and means operable by pressure of fluid in said brake pipe to actuate said valve means to open said communication and operable upon a reduction in pressure of fluid in said brake pipe to actuate said valve means to close said communication and release fluid under pressure from said motor.

SIDNEY G. DOWN.

REFERENCES CITED

The following references are of record in the file of this patent:

UNITED STATES PATENTS

| Number | Name | Date |
|---|---|---|
| 771,338 | Turner | Oct. 4, 1904 |
| 1,180,788 | Murray | Apr. 25, 1916 |
| 2,088,486 | Schoepf | July 27, 1937 |
| 2,170,256 | Stewart | Aug. 22, 1939 |
| 2,203,777 | Detmers | June 11, 1940 |